Patented Feb. 2, 1932

1,843,388

UNITED STATES PATENT OFFICE

TALIAFERRO JAMES FAIRLEY, OF STERLINGTON, LOUISIANA, ASSIGNOR, BY DIRECT AND MESNE ASSIGNMENTS, OF ONE-HALF TO W. J. HUNTER AND ONE-HALF TO MARY P. HUNTER, BOTH OF SHREVEPORT, LOUISIANA

PROCESS FOR TREATING RUBBER

No Drawing.   Application filed May 21, 1928. Serial No. 279,603.

The present invention relates to the treatment of rubber, and it is particularly concerned with a rubber solvent.

Such a solvent may be used either in connection with crude or virgin rubber, or can be used as a reclaiming agent for vulcanized rubber, which latter step is sometimes referred to as de-vulcanization.

The solvent employed is set forth in my co-pending application Serial No. 279,605, filed May 21, 1928, and is prepared by treating one of the series of terpenes by distilling a terpene wood fraction obtained from the direct distillation of wood in the presence of a clay having a catalytic action. For example turpentine is subjected to a distillation in the presence of a clay, usually a colloidal clay having the characteristics of bentonite, and recovering the various fractions as a volatile oil.

The solvent material recovered by this treatment as a distillate or distillates, are mainly the fraction up to 150° and from 150° C. to 170° C., which is quite satisfactory; the fraction from 170 to 190° which is equally satisfactory and to some extent the fraction from 190 to 250 which, however, of itself, is not as efficient as either of the lower boiling fractions.

While the several fractions either individually or collectively are solvents for crude or virgin rubber, I have particularly found them advantageous in connection with the reclaiming of vulcanized rubber.

With the use of such solvents in the reclaiming operation, I am able to recover a plastic rubber mass, or in some cases depending on the method of treating and evaporating or drying, a mass which is somewhat tacky or sticky.

The recovered material also will contain some of the chemical agents which are employed in the original vulcanizing process, and I have found in some cases, although in others it may not be necessary, that with the addition of a small amount of sulphur and heating, the recovered mass may be readily vulcanized in a very short period.

In carrying out the invention, I place the rubber to be devulcanized in a suitable vessel or container, and cover it with a proper amount of solvent. In connection with the vessel, I preferably employ a reflux condenser, and it will be understood that the process proceeds under ordinary atmospheric pressure.

The material is subjected at first to a gentle heat which is gradually increased to a point where the mass appears to boil, which I find to be in the neighborhood of 175° C. for the materials so far treated. This figure is merely approximate and may vary more or less.

This boiling condition is maintained until a test shows that all of the rubber is in solution, when the operation will be discontinued and the solution run off into a suitable intermediate storage vessel and thereafter to an evaporator.

Evaporation of the solution so formed will be carried out in a manner to recover the solvent, so that as I have found in practice, it may be again used. This step, for instance, may be merely the collection of the vapors in a suitable condenser, or any other conventional apparatus.

The evaporation will be conducted with a gentle heat in order to prevent any possibility of burning, as well as to prevent the possibility of vulcanization, since the recovered product contains a portion of the original sulphur, as well as the accelerator and other agents.

When the mass has been evaporated to a point where the material is plastic, this step is discontinued and it will be observed that the recovered product is somewhat tacky and sticky. In order to give the material the plasticity of virgin or crude rubber, I propose to treat the material in a number of ways, which is not essentially within the province of the present invention.

It will be understood that in the boiling process for producing the solution, that in addition to a portion of the sulphur, and accelerators, which are contained in the vulcanized rubber, various other chemical compositions will go into solution, for example, some of the lead components as well as the pigmentary materials.

In addition to the above mentioned ingredients and the rubber which will be in solution, other materials present will be dissolved to a more or less extent. It is significant, however, that the residue after the solution has been drawn off is relatively small and comprises for the most part clay, some insoluble metal compounds, and, of course, a trace of various chemicals either present in the rubber or formed as a result of the treatment none of which, however, are objectionable.

Where the rubber treated contains fibers and textile materials, as in the case of cord tires, there will, obviously, result from the disintegration of the rubber, a mass of such fibers which are insoluble. Of course, in the alkali and acid processes, these would be dissolved, but I find that with my invention, if the solution as withdrawn be screened, this fibrous content may be recovered, as well as many other impurities and large particles which it is desired to remove.

The fibers so recovered may be dried after a suitable washing, and will find a use in connection with paper manufacture where they can be suitably bleached if desired.

The solution itself need not be evaporated if it is desired to employ it in the coating arts.

For example, I have found that the solution as recovered will form an indestructible and water-proof coating for practically any type of surface, such as wood, plaster, stone, concrete and other building materials, as well as an excellent flexible coating agent and impregnating solution for textile materials of various characters. In each case, as stated, the solution will provide a water-proof coating, and one which impregnates the pores and is impervious to the elements.

This, is due to the nature of the solvent, and to the presence of rubber, as well as the rubber compounding materials which I find tend to maintain the coating flexible. In some cases, however, as for example, where a large proportion of lead is present, the coating is somewhat stiffer, but is, nevertheless, quite efficient. The coatings which become relatively stiff, as just described, are very satisfactory metal paints, because there is sufficient flexibility to permit the coating to accommodate itself to flexing and bending of the metal.

In this connection, it will be understood that the evaporation of the solution may proceed to various degrees where it is desired to form a coating composition, so that a greater or less amount of solvent will be present or the rubber and chemical concentration of the solution will be such as to adapt it for a particular purpose. In other words, the concentration may be easily controlled and, obviously, various ingredients known in the coating art may be mixed with the solution as described.

It will be understood that the accelerator, as well as many of the chemical ingredients of the vulcanized rubber will be saved, by reason of my process and, therefore, the recovered material in varying degrees of dryness may be, as stated, quickly vulcanized by the addition of whatever quantity of sulphur is required.

The solvent fractions may be used independently or together in a variety of forms, and are solvents for both the crude and vulcanized rubber. Heating is resorted to in order to accomplish the disintegration and devulcanization, but it will be understood that there is no necessity for pressure other than ordinary atmospheric pressure.

Where the plastic residue, which, after evaporation, has some sticky or tacky characteristics, it will be clear that I can, by a suitable steam treatment, remove the solvent to provide a soft plastic mass very similar to virgin rubber. The only distinction which I have noticed between the crude rubber and the final product, is the presence of sulphur to some degree, as well as the presence of the accelerator and possibly other chemical ingredients used in compounding the rubber.

As stated, the mass either before, or after it is subjected to a final steaming, can be readily made into vulcanized rubber of any degree of elasticity by incorporation of a suitable or required amount of sulphur. With one recovery, I was able to vulcanize the final product in three minutes at a temperature of 140° C., but in other cases, it will take greater or less time and heat, depending upon the materials.

The rubber may be finely ground, but I find that although this is the present and usual practice, my process and solvent will work with excellent results, if the rubber be in various degrees of coarseness. Hence, I preferably cut the crude or vulcanized rubber into relative large size pieces and lumps and operate successfully.

What I claim as new is:

1. The process of treating vulcanized rubber which comprises mixing the rubber with a distillate obtained by distilling a terpene wood fraction obtained from the direct distillation of wood in the presence of a clay having a catalytic action, and heating the mass until the rubber goes into solution.

2. The process of treating vulcanized rubber which comprises mixing the rubber with a distillate obtained by fractionally distilling turpentine in the presence of a clay having a catalytic action, and heating the mass until the rubber goes into solution.

3. The process of treating vulcanized rubber which comprises mixing the rubber with a distillate comprising at least one of the fractions boiling below 250° C. obtained by fractionally distilling turpentine in the presence of a clay having a catalytic action, and heating the mass until the rubber goes into solution.

4. The process of treating vulcanized rubber which comprises mixing the rubber with a distillate comprising the fractions boiling up to 190° C. obtained by fractionally distilling turpentine in the presence of a clay having a catalytic action, and heating the mass to form a solution.

5. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, straining the solution, and driving off and collecting the solvent distillate.

In testimony whereof I have hereunto set my hand.

TALIAFERRO JAMES FAIRLEY.